US012474755B2

(12) United States Patent
Kennedy et al.

(10) Patent No.: US 12,474,755 B2
(45) Date of Patent: Nov. 18, 2025

(54) SYSTEMS AND METHODS FOR DETECTING PRESENCE OR ABSENCE OF A COMPONENT ON A CIRCUIT BOARD

(71) Applicant: Dell Products, L.P., Round Rock, TX (US)

(72) Inventors: Jeffrey L. Kennedy, Austin, TX (US); Timothy M. Lambert, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 51 days.

(21) Appl. No.: 18/488,290

(22) Filed: Oct. 17, 2023

(65) Prior Publication Data
US 2025/0123667 A1   Apr. 17, 2025

(51) Int. Cl.
*G06F 1/28* (2006.01)
(52) U.S. Cl.
CPC ..................... *G06F 1/28* (2013.01)
(58) Field of Classification Search
CPC ........................................ G06F 1/28
See application file for complete search history.

(56) References Cited

U.S. PATENT DOCUMENTS

| | | | |
|---|---|---|---|
| 2009/0135651 A1* | 5/2009 | Kojima | G11C 7/062 365/185.21 |
| 2013/0002272 A1* | 1/2013 | Badaroglu | G01R 31/31717 324/750.01 |
| 2013/0030574 A1* | 1/2013 | Storm | F24F 11/30 702/64 |
| 2017/0060714 A1* | 3/2017 | Han | G06F 1/30 |
| 2017/0098048 A1* | 4/2017 | Brosnan | G16H 40/63 |
| 2019/0165120 A1* | 5/2019 | Sato | H10D 64/685 |
| 2019/0361847 A1* | 11/2019 | Thomson | G06F 16/248 |
| 2020/0264335 A1* | 8/2020 | Bhatia | G05B 19/4183 |
| 2023/0367302 A1* | 11/2023 | Liu | G05B 19/4184 |

* cited by examiner

*Primary Examiner* — Zahid Choudhury
(74) *Attorney, Agent, or Firm* — Fogarty LLP (57) ABSTRACT

Systems and methods for detecting the presence or absence of a component on a circuit board are described. In an illustrative, non-limiting embodiment, an Information Handling System (IHS) may include: a processor; and a memory coupled to the processor, where the memory includes program instructions store thereon that, upon execution by the processor, cause the IHS to: obtain current data from a current monitor, wherein the current monitor monitors current drawn by one or more monitored components of the IHS; and determine based, at least in part, on the current data, a presence or an absence of a required component of the one or more monitored components, or a presence of an unexpected component of the one or more monitored components.

10 Claims, 3 Drawing Sheets

Obtain current data from a current monitor, where the current monitor monitors current drawn by one or more monitored components of an Information Handling System (IHS).
310

Determine based, at least in part, on the current data, a presence or an absence of a required component of the one or more monitored components, or a presence of an unexpected component of the one or more monitored components.
320

*FIG. 3*

SYSTEMS AND METHODS FOR DETECTING PRESENCE OR ABSENCE OF A COMPONENT ON A CIRCUIT BOARD

FIELD

This disclosure relates generally to Information Handling Systems (IHSs), and more specifically, to systems and methods for detecting the presence or absence of a component on a circuit board.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for detecting the presence or absence of a component on a circuit board are described. In an illustrative, non-limiting embodiment, an Information Handling System (IHS) may include: a processor; and a memory coupled to the processor, where the memory includes program instructions store thereon that, upon execution by the processor, cause the IHS to: obtain current data from a current monitor, where the current monitor monitors current drawn by one or more monitored components of the IHS; and determine based, at least in part, on the current data, a presence or an absence of a required component of the one or more monitored components, or a presence of an unexpected component of the one or more monitored components.

In some embodiments, the current monitor monitors current drawn from a power supply of the IHS by a private power supply for the one or more monitored components. In some embodiments, the IHS further includes a resistor including an ohmage of under 1 ohm connecting the power supply of the IHS to the private power supply. In some embodiments, the current monitor monitors the current drawn by the private power supply from the power supply of the IHS by measuring a voltage drop across the resistor, and dividing the voltage drop across the resistor by the ohmage of the resistor. In some embodiments, the resistor includes a tolerance of no greater than 0.0005 ohms.

In some embodiments, the IHS further includes a pull-down resistor including an ohmage of over 10 kiloohms connecting the private power supply for the one or more monitored components to ground. In some embodiments, to determine the presence or the absence of the required component of the one or more monitored components, or the presence of the unexpected component of the one or more monitored components, the program instructions, upon execution by the processor, further cause the IHS to: compare the obtained current data with expected current drawn by the pull-down resistor; and determine the absence of the required component based at least in part on the comparison.

In some embodiments, a baseboard management controller of the IHS obtains the current data from the current monitor, and determines the presence or absence of the required component of the one or more monitored components, or the presence of an unexpected component of the one or more monitored components. In some embodiments, to determine the presence or the absence of the required component of the one or more monitored components, or the presence of the unexpected component of the one or more monitored components, the program instructions, upon execution by the processor, further cause the IHS to: compare the obtained current data with expected power profiles of the required component; and determine the presence of the required component based at least in part on the comparison.

In some embodiments, to determine the presence or the absence of the required component of the one or more monitored components, or the presence of the unexpected component of the one or more monitored components, the program instructions, upon execution by the processor, further cause the IHS to: detect based, at least in part, on the obtained current data, instantaneous or variable currents drawn by the one or more monitored components of the IHS; and determine the presence of the unexpected component based at least in part on the detection. In some embodiments, the program instructions, upon execution by the processor, further cause the IHS to: determine the presence of the unexpected component of the one or more monitored components; and provide a notification to a user of the IHS.

In another illustrative, non-limiting embodiment, a method, includes: obtaining current data from a current monitor, where the current monitor monitors current drawn by one or more monitored components of an Information Handling System (IHS); and determining based, at least in part, on the current data, a presence or an absence of a required component of the one or more monitored components, or a presence of an unexpected component of the one or more monitored components. In some embodiments, the current monitor monitors current drawn from a power supply of the IHS by a private power supply for the one or more monitored components. In some embodiments, a pull-down resistor including an ohmage of over 1000 ohms connects the private power supply for the one or more monitored components to ground.

In some embodiments, the method further includes: comparing the obtained current data with expected current drawn by the pull-down resistor; and determining the absence of the required component based at least in part on the comparison. In some embodiments, the method further includes: comparing the obtained current data with expected power profiles of the required component; and determining the presence of the required component based at least in part on the comparison. In some embodiments, the method further includes: determining the presence of the unexpected component of the one or more monitored components; and providing a notification to a user of the IHS.

In another illustrative, non-limiting embodiment, one or more non-transitory computer-readable storage media store program instructions, that when executed on or across one or more processors of an Information Handling System (IHS), cause the one or more processors to: obtain current data from a current monitor, where the current monitor monitors current drawn by one or more monitored components of the IHS; and determine based, at least in part, on the current data, a presence or an absence of a required component of the one or more monitored components, or a presence of an unexpected component of the one or more monitored components.

In some embodiments, the program instructions further cause the one or more processors to: compare the obtained current data with expected power profiles of the required component; and determine the presence of the required component based at least in part on the comparison. In some embodiments, the program instructions further cause the one or more processors to: determine the presence of the unexpected component of the one or more monitored components; and provide a notification to a user of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
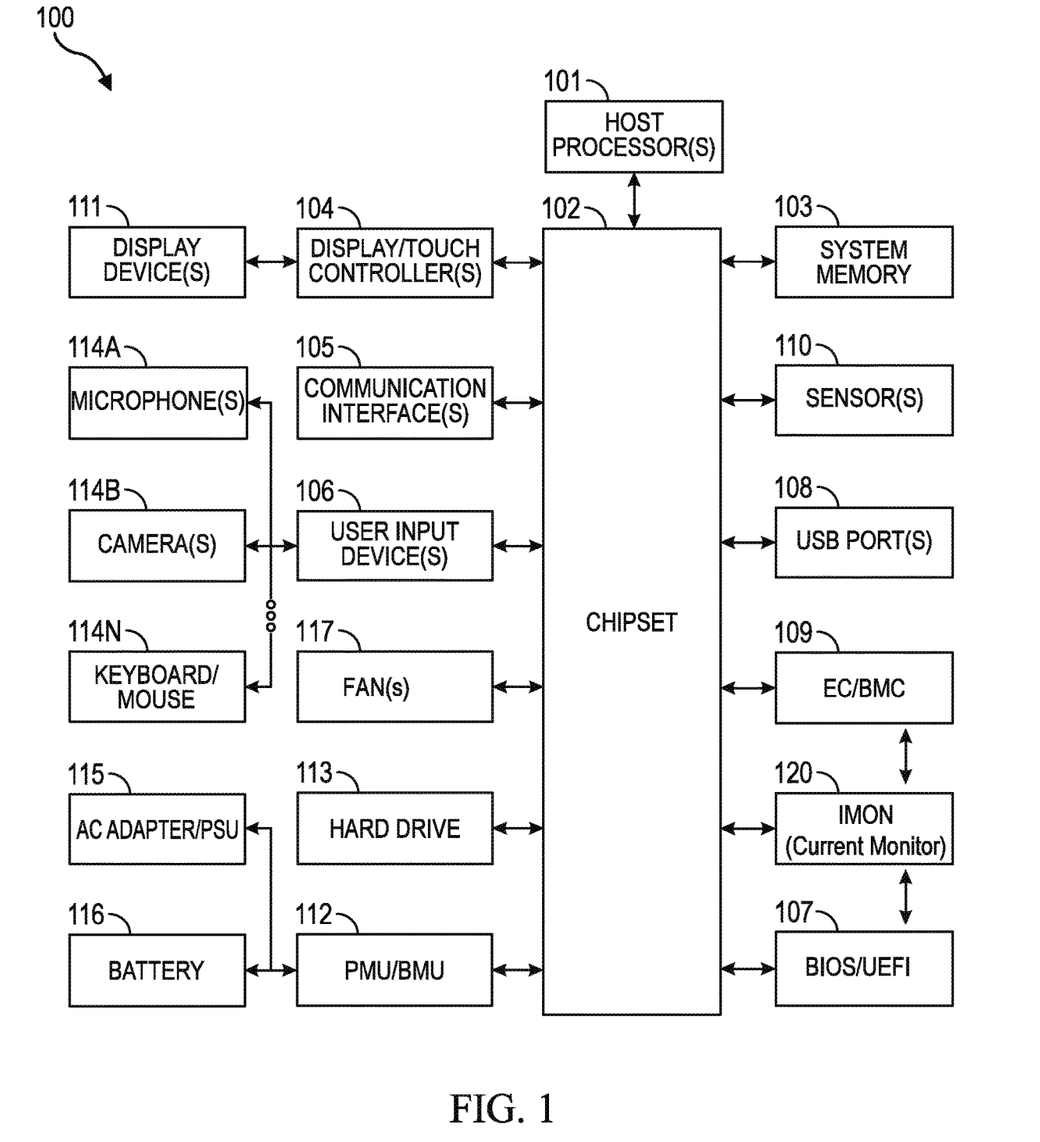
FIG. 1 is a diagram illustrating examples of hardware components of an Information Handling System (IHS), according to some embodiments.

FIG. 1 is a block diagram of hardware components of IHS 100, which may be used to implement the systems and methods for detecting presence or absence of a component on a circuit board.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100. BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

A trusted current monitor ("IMON") integrated circuit ("IC") 120 or can be included as part of the IHS for detecting the presence or absence of a component on a circuit board. In some embodiments, the EC/BMC 109 and/or the BIOS/UEFI 107 can communicate directly with the IMON 120. In some embodiments the IMON 120 is also connected to the chipset 102. The IMON 120 can be operational from the very start of each IHS power reset. The EC/BMC 109 can integrate or attest the trusted IMON IC 120, in some embodiments. In some embodiments, the BIOS/UEFI can also access the IMON, such as via an I2C bus in a circle of trust model.

As will be discussed more fully with regard to FIG. 2, when all of the one or more components to be monitored are not populated, then the IMON 120 measures a near constant trickly current provided by a weak pull-down resistor. When an unexpected component is populated as part of the one or more components to be monitored, the IMON 120 measures additional instantaneous and potentially variable currents drawn. On detection of a suspicious component, user notifications can then be provided via typical methods such as local (e.g., status LED) methods, or remote methods into an attested running firmware, or BIOS, etc. Further, if the one or more components to be monitored is an expected IC, then power patterns of the expected IC can be monitored and compared to an expected power profile of the expected IC.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Platform security requirements are increasing across the industry for authenticity and attestation of firmware components and interfaces within an IHS. Specialized IHS customers can require customization of a standard board design to include an additional Platform Active Root of Trust ("PA-ROT") integrated circuit ("IC") to satisfy their security requirements. This RoT IC might be populated on the board design when shipped to specific customer(s) and not populated for the remainder of customer shipments.

For development and validation efforts and cost reasons, it is highly desirable to have a universal board design (a common PCB with two bill-of-materials ("BoMs")) that supports optional population of the additional RoT IC. The absence or presence of this ROT IC can be strictly governed at the factory as well as pre-customer and post-customer deployment.

A PA-ROT by its very nature intercepts the busses for non-volatile storage of domains, such as BMC firmware, BIOS, or embedded programmable logic devices, etc. Thus, the presence of an alternate unauthorized RoT IC is a possible attack vector for an implanted IC that could severely compromise the security tenants and protections of the system. Traditionally, visual inspection of rework wires and/or components that do not appear to be a natural inclusion of the design (e.g., blue wires) was deemed an acceptable implanted IC detection mechanism. However, the pads or traces of an unpopulated ROT IC provide a workspace for an implanted IC (in the space of the unpopulated RoT IC) that would be difficult to visually detect. In addition, typical PA-ROT chips come in ball-grid-array packages where it is not generally possible to attach wires to such underside signals, lessening the chance that the traditional method of visual inspection would be able to detect an implanted malicious IC component.

The systems and methods for detecting the presence or absence of a component on the circuit board, described herein, provide a novel method for implanted IC detection and system management firmware governance of a system component presence or absence, after an IHS has left the factory without any direct interface to the IHS.

Figure 2:
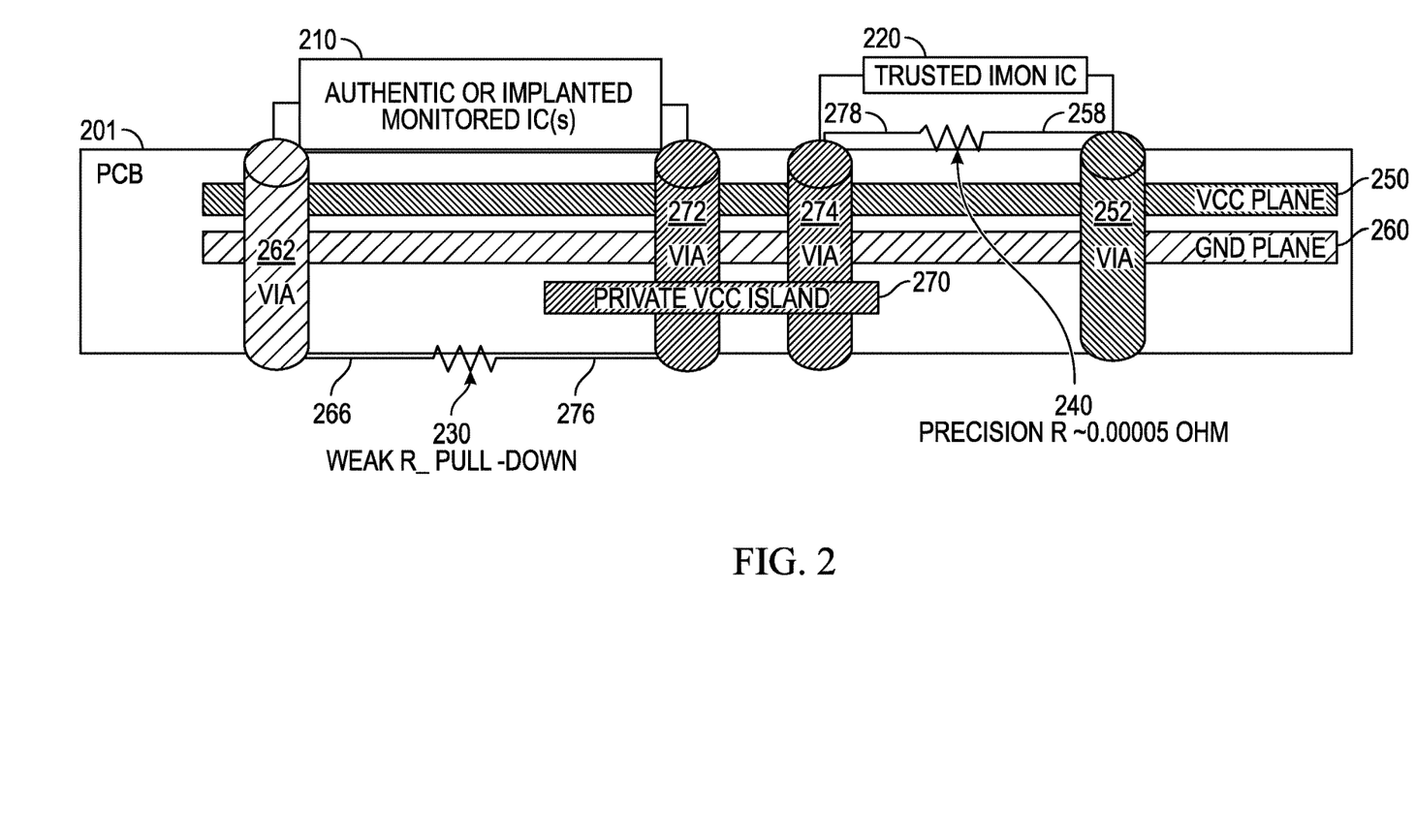
FIG. 2 is a diagram of printed circuit board for detecting the presence or absence of a component on the circuit board, according to some embodiments.

FIG. 2 is a diagram of printed circuit board ("PCB") 201 for detecting the presence or absence of a component 210 on the circuit board, according to some embodiments. The PCB 201 embeds a private VCC 270 for top side IC footprint pads solely on an inner layer (e.g., a private VCC island 270). The top side IC footprint pads are connected to the private VCC island 270 by VIAs 272 & 274.

The top side of the PCB can add a precision resistor 240 between the VIA (274) connected to the one or more target monitored IC's (210) private VCC island 270, and the VIA (252) connected to the rest of the main VCC plane 250. The precision resister 240 can be connected to VIA 274 by connection 278, and can be connected to VIA 252 by connection 258. The precision resistor 240 can have an ohmage the order of around 0.00005 ohms, in some embodiments. The resistor 240 is a precision resistor, and therefore it must have a low tolerance of less than 0.00005 ohms, and preferably less than 0.000001 ohms. The main VCC plane 250 is the power supply for the shared trusted IMON IC 220, as well as any other PCB logic. The private VCC 270 is the power supply for the one or more monitored ICs 210.

A weak pull-down resistor 230 can added to the PCB (e.g., on the bottom side of the PCB) to set the standard (e.g., a constant, pre-defined, and within voltage and resistor tolerances) trickle current when the one or more authentic or implanted monitored ICs (210) are absent. This weak pull-down resistor 230 can be a high ohmage resistor, and can also be a precision resistor, in some embodiments. The weak pull-down resistor 230 can be at least 10 kiloohms or more. The weak pull-down resistor 230 can be connected to a VIA (272) connected to the private VCC island (270) by connection 276, and connected to a VIA (262) connected to ground 260 by connection 266. Any additional current that flows into the dedicated underneath pads of the one or more authentic or implanted monitored ICs 210 (which are also connected to the same VIAs 272 & 262) is measurable, and thus a device presence (on the footprint of the one or more authentic or implanted monitored ICs) is detectable.

A BMC can know, through its programming, if a system model number of the IHS should have one or more authentic monitored ICs 210 populated or not. The BMC can integrate or attest the trusted IMON IC 220. The BIOS also can access the trusted IMON IC 220, such as by an I2C bus in a circle of trust model, in some embodiments.

When no implanted or authentic IC device is populated, the IMON 220 can measure a near constant trickly current provided by the weak pull-down resistor 230. This is because that same current also passes through the precision resistor 240, whose current the IMON 220 monitors and/or measures. The IMON 220 can monitor and/or measure the current drawn by the private power supply 270 from the power supply of the IHS 250 by measuring a voltage drop across the precision resistor 220, and dividing the voltage drop across the resistor by the ohmage of the resistor 220 (which can be on the order of around 0.00005 ohms, in some embodiments).

When an unexpected, implanted IC is populated at 210, the IMON 220 can measure, in some embodiments, additional instantaneous and/or potentially variable currents drawn by the implanted IC. On a detection of a suspicious IC, user notifications can then be provided by typical methods such as local methods (e.g., status LED) or remote methods, such as to an attested running firmware, or BIOS, etc. On the other hand, if an expected, authentic IC is populated at 210, then power patterns can be monitored by the IMON 220, and compared to expected power profiles of the expected IC.

Therefore, the systems and methods for detecting the presence or absence of a component on the circuit board, described herein, provide a system and method for a specific PCB power delivery with instrumentation. In some embodiments, a BMC can detect and report one or more of the following conditions without any direct interface to the device being detected: (a) the absence or presence of a required IC, and/or (b) the presence of an unexpected, implanted IC. In some embodiments, detection of the implanted IC device is accomplished through a precise current monitoring and governance, following a current or power characterization of the authentic device. In some embodiments, notification can occur through methods that do not rely on the entities that could be compromised.

Figure 3:
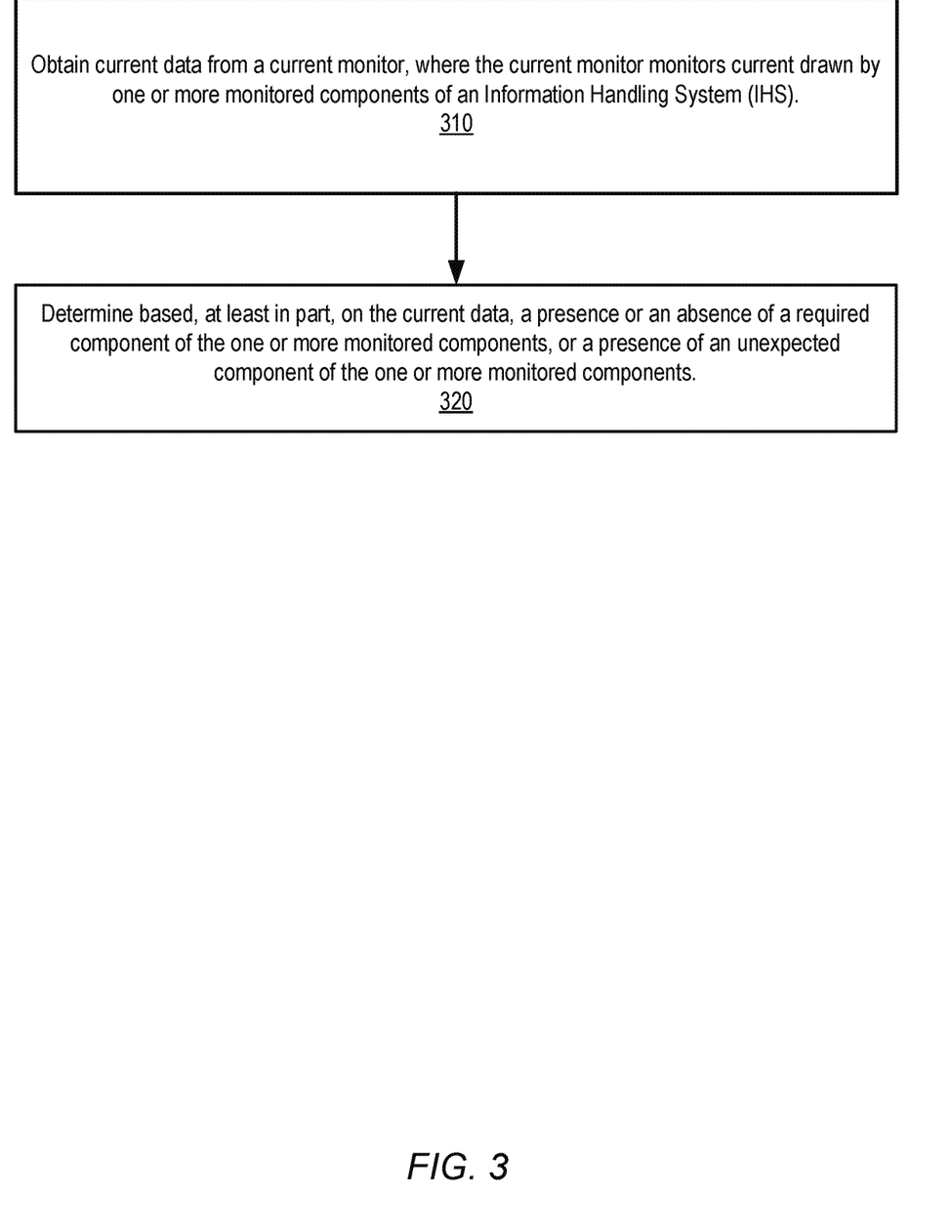
FIG. 3 is a flow diagram illustrating aspects of operations that may be performed to perform a method for detecting the presence or absence of a component on a circuit board, according to at least some embodiments.

FIG. 3 is a flow diagram illustrating aspects of operations that may be performed to perform a method for detecting the presence or absence of a component on a circuit board, according to at least some embodiments. FIG. 3 begins at 310 which obtains current data from a current monitor, where the current monitor monitors current drawn by one or more monitored components of an Information Handling System (IHS). The flowchart then transitions to block 320, which determines based, at least in part, on the current data, a presence or an absence of a required component of the one or more monitored components, or a presence of an unexpected component of the one or more monitored components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, wherein the memory comprises program instructions stored thereon that, upon execution by the processor, cause the IHS to:
obtain current data from a current monitor, wherein the current monitor monitors current drawn by one or more monitored components of the IHS, and wherein the current monitor monitors the current drawn from a power supply of the IHS by a private power supply for the one or more monitored components; and
determine, based at least in part on the current data, a presence of an unexpected component of the one or more monitored components, wherein the unexpected component is a component not expected to be present, and wherein to determine the presence of the unexpected component of the one or more monitored components, the program instructions, upon execution by the processor, further cause the IHS to:
compare the obtained current data with expected current drawn by a resistor; and
determine the presence of the unexpected component based at least in part on the comparison; and
provide a notification to a user of the IHS, wherein the notification indicates the presence of the unexpected component.

2. The IHS of claim 1, a wherein the resistor comprises an ohmage of under 1 ohm connecting the power supply of the IHS to the private power supply.

3. The IHS of claim 2, wherein the current monitor monitors the current drawn by the private power supply from the power supply of the IHS by measuring a voltage drop across the resistor, and dividing the voltage drop across the resistor by the ohmage of the resistor.

4. The IHS of claim 2, wherein the resistor comprises a tolerance of no greater than 0.0005 ohms.

5. The IHS of claim 1, a wherein the resistor is a pull-down resistor comprising an ohmage of over 10 kilo-ohms connecting the private power supply for the one or more monitored components to ground.

6. The IHS of claim 1, wherein a baseboard management controller of the IHS obtains the current data from the current monitor, and determines the presence of the unexpected component of the one or more monitored components.

7. A method, comprising:
obtaining current data from a current monitor, wherein the current monitor monitors current drawn by one or more monitored components of an Information Handling System (IHS); and
determining, based at least in part on the current data, a presence of an unexpected component of the one or more monitored components, wherein the unexpected component is a component not expected to be present, and wherein the determining further comprises:
- detecting, based at least in part on the obtained current data, instantaneous or variable currents drawn by the one or more monitored components of the IHS; and
- determining the presence of the unexpected component based at least in part on the detection; and
- providing a notification to a user of the IHS, wherein the notification indicates the presence of the unexpected component.

8. The method of claim 7, wherein the current monitor monitors current drawn from a power supply of the IHS by a private power supply for the one or more monitored components.

9. The method of claim 8, wherein a pull-down resistor comprising an ohmage of over 1000 ohms connects the private power supply for the one or more monitored components to ground.

10. One or more non-transitory computer-readable storage media storing program instructions that, when executed on or across one or more processors of an Information Handling System (IHS), cause the one or more processors to:

- obtain current data from a current monitor, wherein the current monitor monitors current drawn by one or more monitored components of the IHS; and
- determine, based at least in part, on the current data, a presence of an unexpected component of the one or more monitored components, wherein the unexpected component is a component not expected to be present, and wherein to determine the presence of the unexpected component of the one or more monitored components, the program instructions, upon execution by the processor, further cause the one or more processors to:
  - compare the obtained current data with an expected power profile of a required component of the one or more monitored components; and
  - determine the presence of the unexpected component based at least in part on the comparison; and
- provide a notification to a user of the IHS, wherein the notification indicates the presence of the unexpected component.

* * * * *